United States Patent Office 3,776,855
Patented Dec. 4, 1973

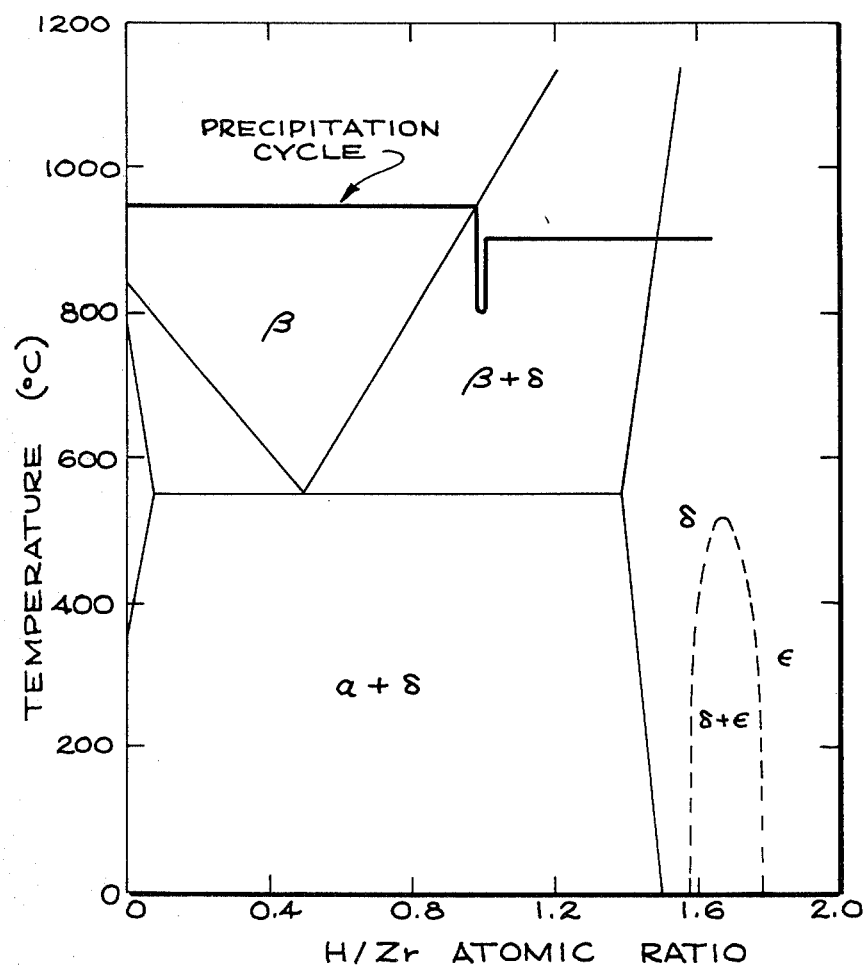

---

3,776,855
HYDRIDING PROCESS
Jan W. Raymond, Canoga Park, and Hideo Taketani, Northridge, Calif., assignors to the United States of America as represented by the United States Atomic Energy Commission
Filed Sept. 14, 1965, Ser. No. 487,337
Int. Cl. C01b 6/00
U.S. Cl. 252—301.1 R          10 Claims

ABSTRACT OF THE DISCLOSURE

A method for hydriding a body of a Group IV–B metal, preferably zirconium, to produce a crack-free metal hydride body of high hydrogen content by cooling the body at the beta to beta+delta boundary, without further addition of hydrogen, to precipitate a fine-grained delta-phase metal hydride in the beta+delta phase region and then resuming the hydriding, preferably preceded by a reheating step.

---

The present invention relates to a method of hydriding metals, and more particularly to a method of producing crack-free metal hydrides in high yield.

Metal hydride compositions such as zirconium and titanium hydrides (Group IV–B of the Periodic Table of the Elements, "Handbook of Chemistry and Physics," pages 448–449, 44th Edition) are employed as moderating materials in nuclear reactors. Hydrogen has the greatest neutron slowing down power of any element, and combined with the Group IV–B metals, which have reasonable structural properties, it is in a relatively stable, high density form. Homogeneous metal hydride nuclear fuel compositions are of particular interest where small reactor cores of high power density are required, for example, for remote terrestrial bases, mobile applications, and as auxiliary power sources in space vehicles. Reactor systems for such applications have been developed, and for information concerning their characteristics reference is made to Nucleonics, vol. 18, No. 1, January 1960.

Hydrogen does not combine with the Group IV–B metals in a fixed stoichiometry; the hydrogen is interstitially dissolved in the metal matrix in variable amounts. The moderating properties of the composition are dependent upon the hydrogen concentration, and it follows that the reactor core size is inversely proportion to the hydrogen concentration. Since size and weight are at a premium, particularly in space power plants, it is necessary to increase power density to reduce the size of the reactor core. This has stimulated the development of methods of increasing the hydrogen concentration of metal hydride fuel compositions. The metal hydrides for such applications are generally produced by massive hydriding methods, wherein metal bodies fabricated to approximately the final shape are heated in a hydrogen atmosphere to absorb the desired concentration of hydrogen. Since the Group IV–B metals expand greatly upon hydriding and the hydrogen distribution must be substantially uniform throughout a fuel rod, massive hydriding heretofore required very long time periods under carefully controlled temperature and pressure conditions to avoid cracking and to assure uniform hydrogen distribution.

Massive hydriding methods are known to the art, and information concerning same can be found in U.S. Pats. 3,070,526; 3,135,697; and 3,154,845. Additionally, methods of reaching very high hydrogen densities in relatively crack-free bodies are disclosed in commonly assigned copending applications Ser. No. 113,036 filed May 26, 1961 for "Process for Massively Hydriding Zirconium-Uranium Fuel Elements" (Norman H. Katz) and Ser. No. 230,803 filed Oct. 12, 1962 for "Method of Massively Hydriding Zirconium-Uranium Alloy" (Edward L. Reed).

It is apparent from the prior art that great care must be exercised in massively hydriding titanium and zirconium to avoid the formation of cracks, and the yields obtained, even in generally satisfactory processes, are undesirably low. Metallographic examination of fractured surfaces of hydrided rods have indicated that the cracking phenomenon is directly attributable to the formation of large columnar delta grains during the phase transformation from beta to delta phases in the hydriding cycle. The extremely brittle columnar delta grains formed on the material surface during the phase transformation are subjected to increasingly greater tensile stresses due to volumetric increase as further hydrogen is absorbed. Rupture and cracking occur intergranularly along the weak radial boundaries of the columnar delta grains when the tensile strength of the brittle ceramic-like delta hydride is exceeded. The solution to the cracking phenomenon, therefore, lies in the elimination of such columnar delta grains in the hydriding process.

The principal object of the present invention, accordingly, is to provide a process of hydriding Group IV–B metals to obtain crack-free bodies.

Another object is to provide an improved method of massively hydriding Group IV–B metals in which the formation of large, columnar delta grains is prevented.

Still another object is to provide such a method which produces a fine-grained structure.

A further object is to provide a precipitation hydriding process for massively hydriding Group IV–B metals to a high hydrogen content without cracking.

Other objects and advantages of the present invention will become apparent to those skilled in the art from the following detailed description and the appended claims.

In the drawing, the single figure is a phase diagram of the zirconium-hydrogen system upon which a preferred embodiment of the present invention is illustrated.

In accordance with the present invention, crack-free metal hydride bodies are obtained by athermally nucleating a fine hydride precipitate uniformly throughout the parent metal matrix. This results in grain refinement and eliminates the tendency for columnar grain growth and coarse grained structure inherent in hydrides prepared by other methods. Through the use of the present precipitation hydriding process, the yields of sound, massive hydrides are increased from about 50 percent to the order of 90 percent.

More specifically, in the present invention the Group IV–B metal is hydrided until the hydride composition is just short of beta saturation (i.e., the beta to beta+delta boundary, referring to the zirconium-hydrogen system of the figure). At this point the charge is isolated and then cooled sufficiently to nucleate delta phase hydride uniformly throughout the matrix. The undercooling in the beta+delta phase causes precipitation of a pro-eutectoid delta phase zirconium hydride throughout the matrix. These finely dispersed delta phase precipitates serve as growth centers for the delta phase when hydriding is subsequently resumed. This results in the elimination of columnar grains, general refinement of the grain sizes, and formation of crack-free massive hydrides.

An illustration of a preferred embodiment of the present precipitation cycle follows with reference to the figure. The zirconium metal or zirconium-uranium alloy is heated in a vacuum to 950° C. Hydrogen is then admitted until the matrix composition is just short of the onset of the beta to beta+delta transformation, which corresponds to an H/Zr ratio of about 1.0 at this temperature. Upon attaining such composition, the charge is equilibrated (i.e., the charge is isolated and maintained isothermal until there is no appreciable pressure drop to assure attainment of beta saturation composition and uniform hydrogen solution). The charge is then rapidly cooled into the beta+delta region resulting in the spontaneous and diffusionless transformation beta to delta. (Diffusionless is used in the sense that hydrogen need not diffuse from the occluding surface to the transforming region for the reaction to occur.) The gas flow is again turned on and the charge reheated to approximately 900° C. The hydrogen addition is then continued to the desired H/Zr composition ratio, at which time the charge is again equilibrated, isolated and cooled to ambient.

The time and temperature relationships may be varied within the scope of the present invention while achieving satisfactory results. Thus, at the beginning of the cycle the heating may be conducted in the beta phase and the beta to beta+delta phase boundary crossed at a temperature sufficiently high to permit transformation of delta nuclei in numbers adequate to refine the grain size. Temperatures within the range 700–1100° C. have been shown to be satisfactory. Reaction kinetics are better at the higher temperatures, but equipment limitations may result in the range of about 900–950° C. being more practical. The charge may ordinarily be hydrided to the phase boundary by any prior art method. The initial hydrogen addition is generally slow to avoid cracking; for example, a flow rate sufficient to bring the charge to the composition $ZrH_{0.05}$ in ten minutes has been found satisfactory. From this point a low hydrogen flow rate may be continued over a period of about twenty-four hours to saturated the beta compositions, but is has been found that the rate may be increased such that the beta saturation composition (H/Zr~1.0 to 900° C.) is attained in two hours.

When the phase boundary is reached the composition is then equilibrated by admitting hydrogen until the pressure drop is less than about 25 torr per hour with the system isolated. Gas addition is then stopped, and the temperature lowered sufficiently to cause precipitation of the delta phase metal hydride throughout the matrix. About 10 percent of the metal hydride is thusly precipitated, although a portion thereof may later be dissolved upon reheating. The exact temperature to which the body is lowered will depend at least in part upon the temperature at which the phase boundary is crossed and cooling initiated. If the boundary is crossed at a higher temperature, the body need not be lowered to the same temperature as when it is crossed at a lower temperature, since precipitation is determined by the existence of a temperature differential rather than by the absolute temperature. The temperature is ordinarily lowered to no higher than about 800° C. (when the phase boundary is crossed in the 900–1000° C. region) at a rate of about 5–15° C./hr., a rate of about 10° C./hr. being optimum. Cooling to lower temperatures, say below about 600° C., is generally not found to increase the rate or amount of precipitation.

After subcooling, the composition is again equilibrated and hydriding continued by any of several methods known to the art. The charge is preferably immediately reheated with the rapid addition of hydrogen to minimize dissolution of the precipitate, and the hydriding cycle continued. The temperature of the reheating step is preferably bounded with a relatively narrow range. If the composition is reheated to its initial temperature or higher, considerable precipitate is redissolved, undoing the work of the precipitation step, whereas if hydrogen introduction is resumed at too low a temperature (much below about 800° C.), the composition is less plastic and more prone to cracking. In the foregoing example where the composition is subcooled to 800° C. from 950° C., the composition may be satisfactorily reheated to a temperature of about 850–925° C., with about 900° C. being preferred. It should be understood, however, that since process kinetics are the primary reason for higher hydriding temperature, reheating is not required and the hydriding cycle may be continued at the lower temperature. In particular, if the beta to beta+delta boundary is initially crossed at a higher temperature it may not be necessary to reheat. For example, if the boundary is crossed at 1100° C., sufficient precipitation may be obtained by cooling to 900° C. or 950° C. where hydriding may be continued with excellent kinetics.

In one very satisfactory reheating method involving using a retort of null void volume, hydrogen is admitted at such a rate that the ensuing beta to delta transformation is completed in approximately eight additional hours when an H/Zr ratio of about 1.5 is reached (see the figure). To avoid any cracking during this step, the flow rate of gas to the retort is restricted such that the pressure within the retort (i.e., the hydrogen pressure in contact with the hydride charge) does not rise above that pressure in equilibrium with the delta phase transformation product at the hydriding temperature being used. After completion of the beta to alpha transformation, the flow rate may be increased to a value such that the composition H/Zr~1.8 is attained in aproximately four additional hours.

Upon attaining the approximately desired composition as indicated from pressure-temperature considerations, the charge is equilibrated and the retort isolated and cooled down to discharge temperature at any desired rate, for example by furnace cooling (i.e., cooling in the retort with the heater power off), by the methods of the referenced copending applications, or by simply removing the retort directly from the furnace. It is apparent that other cooling regimes may be employed by those skilled in the art, as well as other methods of reaching the final desired H/Zr composition subsequent to the present precipitation step.

The following examples will illustrate the present invention in further detail.

EXAMPLE I

Forty-six rods of zirconium-10 weight percent uranium alloy having the dimensions 1¼ in. diameter by 13 in. length were prepared by consumable electrode arc melting and electron beam melting. These rods were placed in a vacuum retort which was heated to 950° C. at a rate of 50° C. per hour while maintaining a dynamic vacuum of $10^{-5}$ torr minimum. Hydrogen was added to the retort from a calibrated volume vessel containing about 5 cu. ft. of purified hydrogen at a pressure of 500 p.s.i. Hydrogen was admitted to the vacuum retort at a rate which gave a pressure drop of 10±1 p.s.i./hour in the calibrated volume, whereby the fuel rods reached an H/Zr composition of 1.0 in 24 hours. At this point the compositions were equilibrated by maintaining the retort at a pressure of 3040 torr until the pressure drop was less than 25 torr/hour when the retort was isolated.

After equilibrium was reached, hydrogen addition to the retort was discontinued, and the fuel cooled to a temperature of 800±20° C., at a rate of 10° C./hr. Upon reaching 800° C., the fuel rods were immediately reheated to 900° C. and hydrogen gas addition continued to reach the final composition H/Zr of 1.5 in 24 hours. The hydrogen flow rate in this step was such as to yield a pressure drop of 5±1 p.s.i. in the calibrated volume, and such that the retort pressure did not exceed about 1200 torr during this state. Upon reaching the total calibrated volume pressure drop in the two hydriding stages of 240±120 or 360±20 p.s.i., the pressure in the retort was increased to 500±40 torr.

While maintaining the pressure of 5000 torr, the fuel rods were cooled to a temperature of 700±20° C., at a rate of 10° C. per hour. Equilibration was then carried out by maintaining the retort pressure at 5000 torr until the pressure drop was less than 25 torr per hour, when the furnace and gas supply were shut off and the fuel rods permitted to furnace cool to ambient temperature.

Of the 46 rods hydrided, only 4 cracked, giving an excellent overall yield of 87 percent. The following is specimen data for a representative one of the hydrided fuel rods.

|  | Before hydriding | After hydriding |
|---|---|---|
| Diameter, in | 1.227 | 1.313 |
| Length, in | 12.716 | 13.195 |
| Weight, gms | 1,697.543 | 1,729.167 |
| Weight gain, gms |  | 31.624 |
| Percent hydrogen as weight gain |  | 1.83 |

EXAMPLE II

Massive bodies of the zirconium parent metal to be hydrided were first given a surface preparation treatment by liquid honing and pickling in fluoride acid solutions so as to insure presence of a clean active surface. The charge was then loaded in retort of such shape and dimension which insured a null or negligible void volume upon isolation of the retort. The retort was fabricated from cylindrical stellite of such dimensions that when it was charged the room temperature void volume was minimized to the extent that it could influence the hydride composition only two parts in the third decimal place on the basis of hydrogen-to-zirconium atom ratio (i.e., $ZrH_{\pm 0.002}$). Thus isochoric heating and cooling was assured, thereby eliminating establishment of core-to-surface hydrogen gradients and attendant cracking tendencies associated with gradient formation. Included in the charge were two zirconium "end-plugs" placed one at either end of the work piece, in contact with the work piece. These end-plugs were approximately 1" long and of the same diameter as the work piece and served to continue the isothermal profile beyond the work piece.

The charge was then evacuated to $10^{-5}$ torr and heated under dynamic vacuum by rolling on a preheated furnace maintained at $900\pm 1°$ C. over the entire charge length. When temperature equilibrium had been established the charge was isolated from vacuum and the initial hydrogen addition (having less than 10 p.p.m. total impurity) was made at a uniform flow rate such that the composition $ZrH_{0.05}$ was attained in not less than ten minutes. This step avoided formation of extreme temperature gradients (resulting from cooling of the inflowing expanding gas and the exothermic nature of this hydrogen occlusion) and hydrogen gradients that would drive sections of the charge into the two phase alpha+beta field and result in surface crack formation. From this point the flow rate was increased such that the beta saturation composition (approximately $ZrH_{1.00}$ at this temperature) was attained in two hours. Caution was exercised at this point to assure that the gas addition was stopped just short of the onset of the beta to delta transformation composition.

The charge was then equilibrated, isolated, and rapidly cooled by removal of the furnace from the retort. Upon attaining a charge temperature of approximately 600° C. the furnace was rolled back on and the hydrogen flow again established after being re-adjusted to a rate such that the beta to delta transformation was completed in approximately eight additional hours. Subsequent to completion of the beta to delta transformation, the flow rate was increased to such a level that the composition $ZrH_{1.8}$ would be attained in four additional hours. Upon attaining the desired composition as indicated from pressure-temperature considerations, the charge was equilibrated, the retort isolated, and the furnace rolled off providing rapid attainment of discharge temperature. Uniformly high quality, crack-free zirconium hydride bodies were obtained.

It should be understood that the foregoing example is illustrative rather than restrictive of the present invention. Variations in the hydriding process may be made by those skilled in the art utilizing the present precipitation method which are within the scope of the present invention. As used herein, the term Group IV-B metal, zirconium or titanium, is intended to embrace both the metal and its alloys, including actinide alloys such as of uranium. Therefore, it should be understood that the present invention is limited in scope only as is indicated by the appended claims.

Having thus described the present invention, the following is claimed:

1. In a method of hydriding a Group IV-B metal body to form a massively hydrided crack-free metal hydride body, the improvement which comprises precipitating a portion of said metal in the beta+delta phase region as a uniformly distributed, fine-grained delta phase precipitate by cooling said body at the beta to beta+delta phase boundary without further addition of hydrogen to a temperature within the beta+delta phase region, and then continuing the hydriding into the delta phase region.

2. In a method of hydriding a Group IV-B metal body, the improvement which comprises
    (a) cooling the metal hydride body at the beta to beta+delta boundary to a temperature in the beta+delta phase region while ceasing contacting the composition with hydrogen, thereby causing precipitation of a portion of the metal as a finely dispersed delta phase metal hydride, and
    (b) then increasing the temperature and continuing the hydriding into the delta phase region.

3. The method of claim 2 wherein
    (a) the Group IV-B metal body is zirconium,
    (b) the temperature at said beta to beta+delta boundary is about 900–1000° C.,
    (c) the body is cooled to a temperature between about 600° C. and about 850° C., and
    (d) the body is reheated to a temperature of about 850–925° C. and the hydriding is continued into the delta phase region.

4. The method of claim 2 wherein
    (a) the Group IV-B body is zirconium,
    (b) the temperature of the zirconium body during the hydriding in approaching the beta to beta+delta boundary is maintained at about 900° C.,
    (c) the body is cooled to a temperature no lower than about 600° C. within the beta+delta phase region, and
    (d) the temperature is thereafter returned to about 900° C. while continuing the hydriding into the delta phase region.

5. The method of claim 4 wherein said zirconium body contains about 5–20 weight percent uranium.

6. An improved method of forming a crack-free Group IV-B metal hydride body, which comprises
    (a) contacting said body with hydrogen in the beta phase region in an inert environment,
    (b) continuing the introduction of hydrogen until the beta saturation composition is reached,
    (c) lowering the temperature of the metal hydride body to a temperature within the beta+delta phase region while ceasing the introduction of hydrogen, thereby precipitating a portion of said metal hydride as a finely dispersed delta phase within the beta hydride matrix,
    (d) resuming the introduction of hydrogen until the final desired hydrogen to Group IV-B metal composition ratio is reached, and
    (e) then returning the hydrided body to ambient conditions.

7. An improved method of forming a crack-free zirconium metal hydride body, which comprises
    (a) contacting said body with hydrogen at a temperature of about $950\pm 100°$ C. until the beta+delta phase region is reached,
    (b) ceasing hydrogen flow and cooling the body to a temperature no higher than about 800° C. in said phase region at a rate of about 5–15° C./hr. to precipitate in said body a finely dispersed second phase delta-phase metal hydride, (c) thereupon rapily increasing the temperature of the resulting body to a temperature of about 850–925° C. and resuming the introduction of hydrogen until a selected H/Zr ratio is obtained, and (d) then slowly returning the body to ambient conditions.

8. An improved method of hydriding a zirconium body, which comprises (a) heating said body in vacuum to a temperature of about 900° C., (b) slowly contacting said body with hydrogen in the beta phase region until the beta+delta phase boundary is reached, (c) ceasing the introduction of hydroyen, cooling the body to a temperature of about 800° C. at a rate of about 10° C./hr., thereby precipitating a portion of said zirconium hydride as a fine-grained delta-phase precipitate in the zorconium hydride matrix.

(d) thereupon increasing the temperature of said body to about 900° C. at a rate of about 10° C./hr., and resuming the slow introduction of hydrogen until the final H/Zr ratio desired in said body is reached, and (e) then slowly returning said body to ambient conditions.

9. The method of claim 8 wherein said zirconium contains about 5–20 weight percent uranium.

10. The method of claim 9 wherein said zirconium contains about 10 weight percent uranium.

References Cited

UNITED STATES PATENTS

| 1,816,830 | 8/1931 | Driggs. | |
| 3,018,169 | 1/1962 | Vetrano | 23—204 |
| 3,070,526 | 12/1962 | Merten | 23—204 X |
| 3,135,697 | 6/1964 | Simnad et al. | 176—89 X |
| 3,154,845 | 11/1964 | Simnad et al. | 23—204 X |

CARL D. QUARFORTH, Primary Examiner

R. L. TATE, Assistant Examiner

U.S. Cl. X.R.

176—92; 423—645, 255